United States Patent [19]

Farber et al.

[11] 3,768,232

[45] Oct. 30, 1973

[54] SOLVENT RECOVERY SYSTEM

[75] Inventors: Milton Farber, San Marino; Albert F. Bush, Northridge; Franklin J. Wiens, Santa Monica, all of Calif.

[73] Assignee: Republic Corporation, Century City, Calif.

[22] Filed: Jan. 6, 1972

[21] Appl. No.: 215,812

[52] U.S. Cl. .................................. 55/58, 55/208
[51] Int. Cl. ............................................. B01d 53/4
[58] Field of Search ................. 55/58, 62, 74, 387, 55/208; 203/47

[56] References Cited
UNITED STATES PATENTS

| | | |
|---|---|---|
| 3,494,102 | 2/1970 | Dunn .................................. 55/62 |
| 3,085,379 | 4/1963 | Kiyonaga .............................. 55/58 |
| 3,359,707 | 12/1967 | Jean ..................................... 55/33 |
| 3,361,649 | 1/1968 | Karter ................................. 203/47 |
| 3,224,168 | 12/1965 | Gregory .............................. 55/208 |

Primary Examiner—Charles N. Hart
Attorney—Samuel Lindenberg et al.

[57] ABSTRACT

A solvent recovery system comprising an adsorbent bed for stripping the solvent from an air stream and a vacuum distillation and condensation unit for desorbing the solvent from the bed and recovering the solvent for reuse and regenerating the bed for the next adsorption cycle.

21 Claims, 3 Drawing Figures

3,768,232

SOLVENT RECOVERY SYSTEM

BACKGROUND OF THE INVENTION

1. Field of the Invention:

The present invention relates to a vapor recovery system and more particularly to a continuous system for removing and recovering organic pollutants from output gas streams of chemical process plants.

2. Description of the Prior Art:

Many industrial processes utilize volatile solvents. Until very recently, the solvent vapors were simply emitted to the atomsphere as they are being evaporated. This in many cases caused contamination of the plant air breathed by personnel, polluted the atmosphere and entailed the loss of a valuable product.

Many plants are now treating their exhaust gases to remove the solvent before the gases can be vented to the atmosphere. One of the treatment systems involves adsorption of the solvent followed by steam desorption, condensation and separation of the solvent from water. Such a system is not adaptable to high boiling solvents or oils having very high boiling points, near or above the steam temperature. Furthermore, current treatment requires separation of solvent from the condensed steam.

SUMMARY OF THE INVENTION

The present invention relates to an improved solvent separation and recovery system which is not limited to low boiling organic materials and does not require steam distillation or water separation from recovered solvent.

The solvent recovery system of the invention utilizes a bed of adsorbent for separation of the solvent vapor from the outlet gas from the processing plant. Recovery is accomplished by distilling the solvent from the bed of absorbent at reduced pressure and moderate temperature. The vapors are condensed and collected.

Preferably, the system of the invention includes a plurality of independent adsorbent beds and a vacuum distillation, condensation and collection system. A manifold system provides a means of sequentially connecting an exhaust to the beds to permit continuous operation of the recovery system with one bed or with several beds operating in series or in parallel in the adsorption phase while one or more remaining beds are being subjected to the desorption and recovery phase of the cycle.

These and many other attendant advantages of the invention will become apparent as the invention becomes better understood by reference to the following detailed description when considered in conjunction with the accompanying drawings.

DESCRIPTION OF THE PREFERRED EMBODIMENTS

Figure 1:
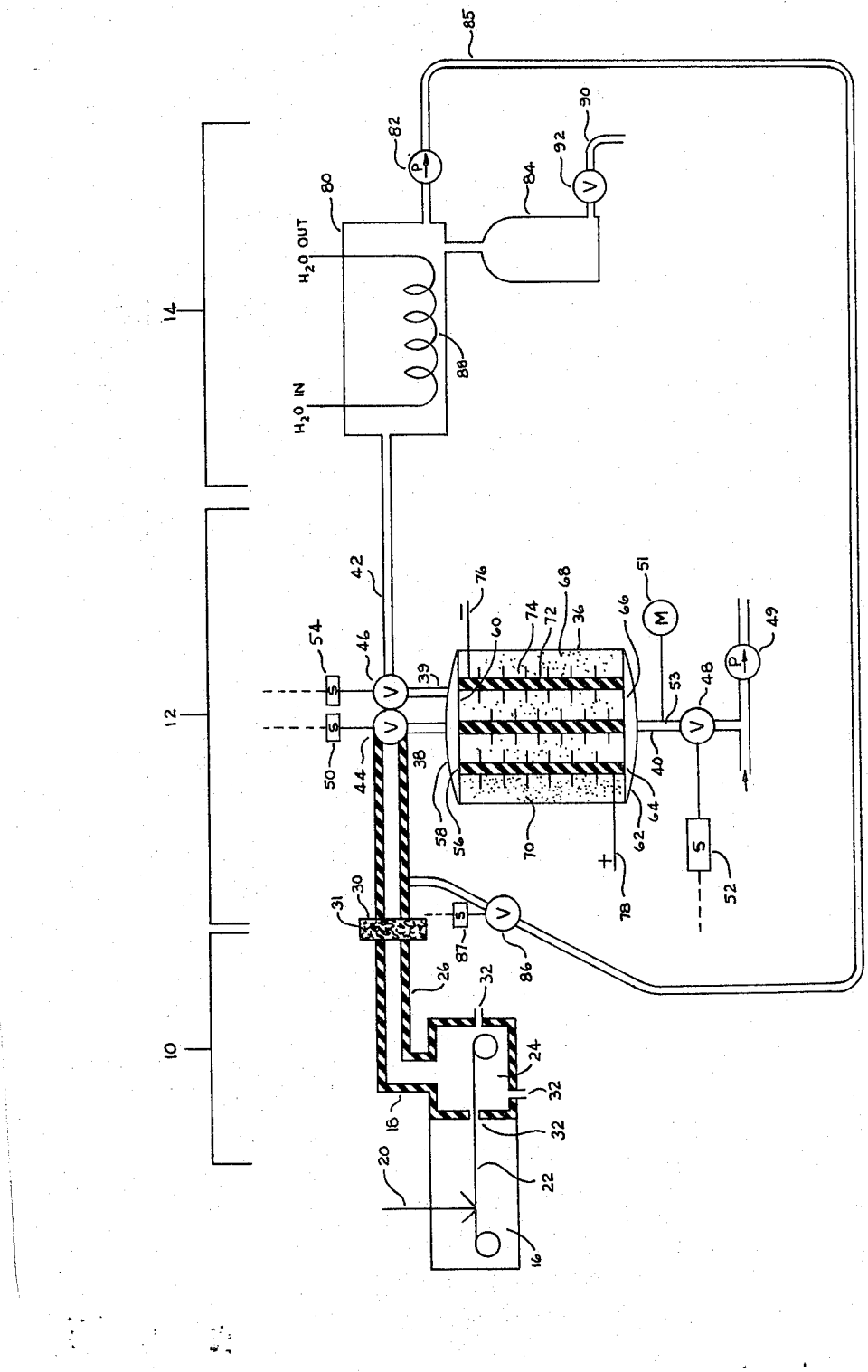
FIG. 1 is a diagrammatic view of the system according to the invention.

Referring now to FIG. 1, the solvent recovery system of the invention generally includes a vapor delivery section 10, a vapor adsorption section 12 and a vapor desorption and recovery section 14. The processing plant 16 may involve the addition of a solution at 20 to a sheet 22. Depending on the boiling point and volatility of the solvent, the final solvent elimination stage in the plant may include a drier section 24. The air stream containing vaporized solvent leaves the processing plant 16 through a vent 18. To prevent condensation of the solvent during travel to the adsorber section 12 the duct 26 may be insulated.

Particulate matter may be removed in a filter 30 containing a suitable filter material 31 such as metal or spun glass. The vapor flows through the adsorber 12 by means of a high throughput of air from inlets 32 and is discharged through outlet 40 by the induced draft blower 49. Since the blower 49 is downstream of the adsorber tank 36, the exhaust air is free of solvent vapor and avoids deposition of solvent within the blower.

The adsorber section includes a tank 36 having an inlet 38, a distilled vapor outlet 39 and an air outlet 40. The inlet duct 26, duct 42 and outlet 40 each contain isolation valves 44, 46, 48, respectively. The valves may be activated by servo-mechanisms 50, 52 and 54 from a central control panel not shown. The quality of the exhausted air may be continuously monitored by a meter 51 having a probe 53 extending into the outlet duct 40. The inlet 38 is connected to a plenum 56 formed between the top 58 of the tank and the perforated plate 60. The space between the bottom 62 of the tank and a second perforated plate 64 forms a second plenum 66.

An adsorbent compartment 68 is formed between the plates 60 and 64. The perforated plates, 60, 64 allow the passage of gas or vapor but prevent the passage of the adsorbent 70. The adsorbent forms a compact, porous bed of adsorbent. The adsorbent may be a solid permeable mass but preferably is a compact bed of particulate material which may be in granular, rod or filamentary form. The adsorbent preferably has selective adsorptivity for solvent vapors and does not adsorb gases contained in the air stream. The compactness of the bed prevents channels being formed during use. A preferred adsorbent for use with high boiling solvents is activated carbon granules.

A plurality of heating elements such as electrical resistance heating rods 72 containing fins 74 are disposed within the porous bed of adsorbent. The rods are activated by means of electrical leads 76, 78 extending through vacuum seals through the wall of tank 36.

The recovery section 14 includes a vacuum pump 82, condenser 80 and solvent holding tank 84. A recycle line 85 including a valve 86 and servo 87 recycles the exhaust from the vacuum pump 82 to the adsorber 14. The condenser 80 may include a coil 88 receiving a flow of coolant such as water. The solvent condenses and collects in tank 84 and can be removed through drain 90 containing valve 92. The disposition of vacuum pump 86 downstream from the condenser precludes deposits of solvent vapor.

When the plant 16 is in operation, servos 50 and 52 are energized to open valves 44 and 48 while servos 54 and 87 are energized to close valve 46 and 86. Blower 49 is turned on to introduce an air flow through the system 32, 26, 38, 70 and 40. The solvent laden air leaves the drier or oven through vent 18, is carried by the air through filter 30 and is stripped of solvent in tank 36 as it passes through the bed 70 of adsorbent. Clean air leaves through the exhaust of blower 49. When the bed 70 is loaded, valves 44 and 48 are closed, and valves 46 and 86 are opened. The blower 49 is turned off and vacuum pump 82 is turned on. The power source to the heating rods 72 is activated and the flow of coolant to coil 88 is initiated.

The heating rods 72 heat the adsorbent granules 70 to a temperature above the boiling point of the adsorbed solvent at the vacuum maintained by the vacuum pump 82. The solvent vapors flow into the condenser 80, condense into liquid and are collected in the tank 84. After the solvent has been vacuum distilled from the adsorbent 70, the desorption and collection cycle is terminated and the adsorbent bed is in a reactivated form. The collected solvent is now available for reuse.

The vapor recovery system of the invention is useful in any installation generating organic solvent vapor. The system traps and recovers for reuse valuable solvents and provides clean air emission to the atmosphere within and without the plant. For example, the system can be utilized in dry cleaning, painting, casting, molding, plastic, textile and printing. Typical solvents are halogenated hydrocarbons such as trichloroethylene, carbon tetrachloride, perchloroethylene, chlorobromomethane, methylene chloride, alcohols such as methanol, ethanol, isopropanol, ketones such as acetone, MEK, MIK, ethers such as tetrahydrofuran, aromatic hydrocarbons such as benzene, toluene, xylene, and aliphatic hydrocarbons such as $C_5$–$C_{18}$ alkanes such as hexane, pentane, etc. The system is particularly adaptable to high boiling hydrocarbon solvents such as $C_{10}$ to $C_{18}$ hydrocarbons having boiling points from about 350°F to about 600°F at one atmosphere.

In the system of the invention the boiling point of the solvent is substantially reduced during vacuum distillation. The lower boiling temperature permits use of the system with thermolabile materials which would pyrolyze or rearrange at higher temperatures and allows recovery of high boiling solvents which would not distill at low pressure steam temperature. Furthermore, there need be no concern whether the solvent is soluble or miscible with water during desorption and condensation. Preferably, the adsorbent bed is maintained at a low pressure of no more than 50 torr and preferably below 5 torr. For example, $C_{14}$–$C_{16}$ hydrocarbon alkane oils which have a boiling point of 470°F at one atmosphere have a boiling point of only 194°F at 1 torr.

The amount of adsorbent and air flow capacity should be sufficient to substantially remove most of the solvent vapor eliminated by the process at any moment with reasonable flow rate. Furthermore, the larger the volume or surface area of adsorbent, the longer the adsorber can be maintained in operation before breakthrough. The volume of adsorbent should be sufficient to maintain operation for a period sufficiently more than the time required for desorption such that the absorbers in parallel can be cycled alternately to provide continuous operation.

The solvent adsorbent systems previously utilized to date have not been known to be used for the adsorption of higher boiling hydrocarbons, probably because there was no effective way to regenerate the adsorption medium. A test was conducted to determine the effectiveness of an activated charcoal adsorbent bed in removing these oils from an air stream. The bed had a volume of about 2 cu. ft. Sampling and analysis were conducted according to Rule 66 of the Los Angeles County APCD. The results were as follows:

TABLE I

| | Inlet | Outlet |
|---|---|---|
| Temperature, °F | | 150. |
| Velocity, ft/sec | | 32.0 |
| Flue Diameter, inches | | 4. |
| Flue Area, sq. ft. | | 0.0873 |
| CFM | | 168. |
| SCFM | 143 | 143 |
| Gas Analysis | | |
| Carbon monoxide (CO), ppm | 120. | 218. |
| Methane ($CH_4$), ppm | 10. | 10. |
| Carbon dioxide ($CO_2$), ppm | 5000. | 5000. |
| Condensible Hydrocarbons (as $C_1$), ppm | 1266 | 108. |
| Efficiency, % = [(1266−108)/1266] × 100 | | 91.5% |

It is evident that the activated carbon absorber is capable of effectively removing $C_{14}$–$C_{16}$ alkane solvent oil vapors from an air stream. A typical saturation loading of a bed of activated carbon with solvents is 25 to 50 parts by weight of solvent for each 100 parts by weight of carbon.

Figure 3:
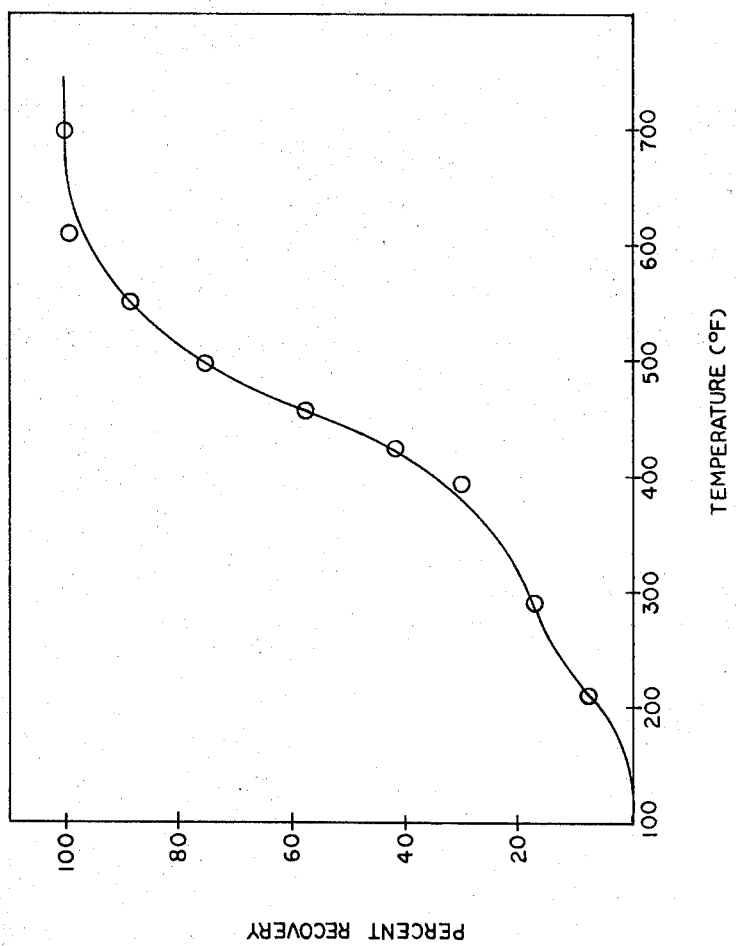
FIG. 3 is a graph of percent recovery versus temperature for the recovery of $C_{14}$—$C_{16}$ hydrocarbons at 1 torr from a bed of activated carbon.

A further test was conducted to determine the desorption efficiency of vacuum distillation desorption of $C_{14}$–$C_{16}$ hydrocarbon alkane oil loaded activated carbons. A particular sample containing 28 percent of the oil was subjected to vacuum distillation at 1 torr for 3 hours at various temperatures. The results as shown in FIG. 3. At 600°F. or a $\Delta T$ of about 400°F above the boiling point at 1 torr, 100 percent recovery is achieved. Optimal operation of the system may occur at percent recoveries below 100 percent and a smaller $\Delta T$. Recovery is achieved at much lower temperature than is possible by steam distillation and recovery is effected in an inert vacuum atmosphere rather than an oxygen containing steam atmosphere.

Figure 2:
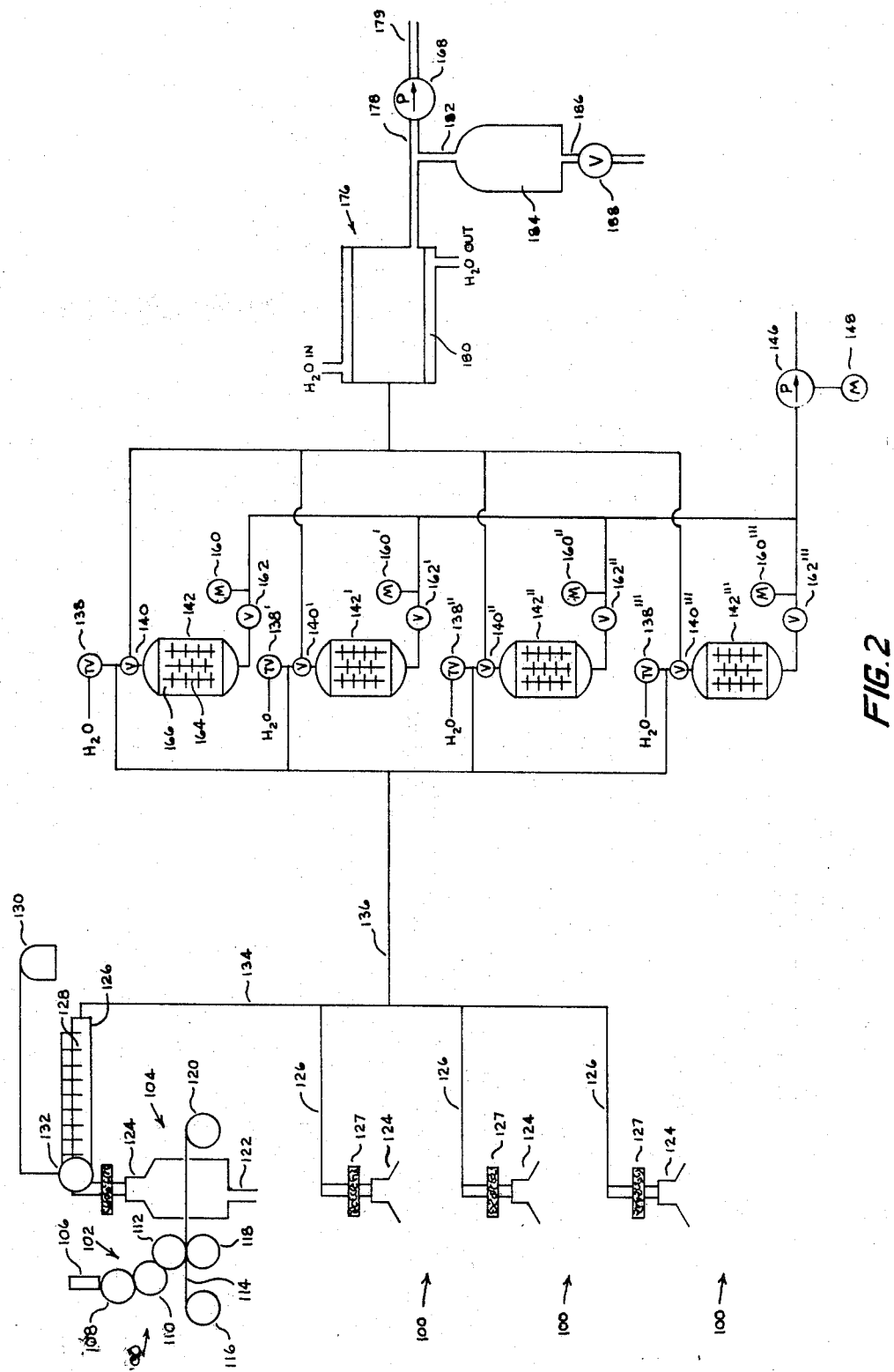
FIG. 2 is a schematic view of a continuous solvent recovery system of this invention.

A more detailed continuous solvent recovery system for a heat set lithographic plant is illustrated in FIG. 2. The system is designed to remove at least 90 percent of the $C_{14}$–$C_{16}$ alkane oil solvent from each of four presses. The ovens evaporate about 20–25 lbs per hour of the solvent oil. Only the first press 100 is shown for purposes of illustration.

Each press 100 has a printing section 102 and a drier section 104. The printing section includes an ink reservoir 106 containing an ink in which the $C_{14}$–$C_{16}$ solvent oil is an ingredient. The reservoir 106 applies the ink to an inking roller 108 which is in turn transferred to the printing roller 110 containing the master and then to an offset roller 112. A sheet of paper 114 from roll 116 is imprinted between offset roll 112 and an impression roll 118. The sheet continues its travel through the drier section 104 onto the take up roll 120.

In the drier section 104 hot air entering through inlet 122 dries the sheet and carries the oil and other vapors and heated gases into the emission stacks 124 of each press 100. Each stack 124 may be provided with a particulate filter 127. Each insulated duct 126 may be provided with a fire extinguishing unit comprising a series of $CO_2$ sparger jets 128 connected to a $CO_2$ tank 130 by means of a temperature reactive valve 132 suitably set to be activated at a temperature of 500°F. The ducts join a header duct 134 which feeds the combined emissions into duct 136.

A temperature reactive valve 138 connected to a water source may also be provided immediately above each isolation valve 140 on the top of each adsorber tank 142. The valve 138 may also be set to be activated at 500°F so as to flood the tank 142 in case of fire. The hot vapor mixture typically leaves the stack at 300°F and all duct work should be insulated up to isolation valve 140. The vaporous emission is induced through the tanks by a blower 146 driven by a motor 148. The blower 146 is connected to the tank isolation valve 162 by duct 172.

Each tank 142 may contain 6000 pounds of activated charcoal and three tanks in use simultaneously would be sufficient to remove all hydrocarbon solvent emitted from all four presses 100. The breakthrough of the tank should be staggered so that each tank may be subjected to a regeneration recovery cycle separately. Each tank may have an adsorption cycle of from 5 hours to 50 hours, typically about 24 hours. The desorption cycle should be less than the adsorption cycle.

The tanks may be controlled by means of a signal from meter 160 sensing solvent breakthrough or by means of a time-controlled cycle. For example, tank 142 may be set at 0 time or 100 percent adsorption, when tank 142' is at ⅓ cycle, tank 142'' is at ⅔ cycle and tank 142''' is at 3/3 cycle and has been switched to desorption. Each ⅓ cycle the central controller switches the next tank onto desorption cycle and returns the regenerated tank to an adsorption cycle.

The tanks 142 are similar to those shown in FIG. 1 and contain an isolation valve 162 in the air outlet and finned heating elements 164 embedded within the bed of adsorbent 166. The inlet side of the condenser 180 is connected to the two-way isolation valves 140 by means of ducts 170. The output side of the condenser 180 is connected to the storage tank 184 by means of a duct 182, and to the inlet side of the vacuum pump 168 by a duct 178.

Cold water is circulated through the annular shell 180 of the condenser and the condensed solvent flows through drain pipe 182 into storage tank 184. The storage tank should have a 500 gallon capacity sufficient for more than 24 hour continuous operation. The collected solvent may be drained through outlet drain 186 containing valve 188 for reuse when the vacuum pump 186 is off and vacuum on the system is released.

It is to be understood that only preferred embodiments of the invention have been described and that numerous substitutions, modifications and alterations are all permissible without departing from the spirit and scope of the invention as defined in the following claims.

What is claimed is:

1. A solvent recovery system comprising in combination:
   adsorbent bed means receiving a flow of solvent vapor in carrier gas for stripping solvent vapor from a gaseous carrier stream;
   a vacuum distillation means for desorbing the solvent from the bed after termination of the flow of carrier gas including,
   means for reducing the atmospheric pressure on said bed until the boiling temperature of the solvent adsorbed by said bed has been reduced to a predetermined value; and
   means for heating said bed and solvent until the adsorbed solvent reaches a temperature at or above said boiling temperature value whereby it is distilled from said bed;
   means for condensing the distilled solvent vapor; and
   means for collecting the condensed solvent.

2. A system in accordance with claim 1 in which the adsorbent bed means includes a closed container including a bed receiving chamber and having a carrier gas inlet disposed at one side of said chamber, carrier gas outlet disposed to an opposite side of said chamber and a distilled vapor outlet.

3. A system in accordance with claim 2 in which the carrier gas inlet and distilled vapor outlet are combined and further including a first valve disposed in the carrier gas outlet and a two-way isolation valve disposed in the combined inlet-outlet for selectively communicating said container with said inlet and with said distilled vapor outlet.

4. A system in accordance with claim 2 in which said adsorbent bed means is formed of a body of activated granular carbon adsorbent.

5. A system in accordance with claim 2 further including heating means extending through the adsorbent bed means.

6. A system in accordance with claim 2 in which the heating means includes a plurality of electrical resistance heating rods.

7. A system in accordance with claim 6 further including fins attached to said rods and extending into the bed of adsorbent.

8. A system in accordance with claim 2 further including pump means disposed in said carrier gas outlet for inducing the flow of said carrier gas through said adsorbent bed means.

9. A system in accordance with claim 1 in which said vacuum distillation means includes a vacuum pump connected to the said condensing means.

10. A system in accordance with claim 9 further including recycle conduit means connecting the output of said vacuum pump to the said carrier gas inlet.

11. A system in accordance with claim 3 in which said system includes a plurality of said adsorbent bed means and a manifold means independently connecting the two-way isolation valve on each container to the vacuum distillation means.

12. A system in accordance with claim 11 further including servo means connected to each of said first valves and each of said two-way isolation valves.

13. A method of recovering solvent from the output of an industrial process comprising the steps of:
   flowing vaporized solvent through at least one bed of solid adsorbent to adsorb the solvent thereon;
   vacuum distilling the adsorbed solvent from the bed including the steps of:
   reducing the atmospheric pressure on said bed until the boiling temperature of the solvent adsorbed reaches a predetermined value; and
   heating said bed and solvent to said boiling temperature value or above until said solvent is distilled from said bed;
   condensing the distilled solvent vapor; and
   collecting the condensed solvent.

14. A method in accordance with claim 13 further comprising dispersing the vaporized solvent in a carrier gas and flowing the dispersion through the bed.

15. A method in accordance with claim 14 in which the carrier gas is air, the adsorbent comprises a bed of activated carbon and the solvent is an alkane oil containing at least 10 carbon atoms.

16. A method according to claim 13 in which the vacuum distillation is conducted at a pressure below 50 torr and a temperature above the boiling point of the solvent at said pressure.

17. A method according to claim 16 in which the pressure is below 5 torr and the temperature is at least 100°F above the boiling point of the solvent.

18. A method according to claim 14 in which the dispersion is induced through the bed by a pump disposed downstream from the bed.

19. A method according to claim 13 in which the vacuum for vacuum distilling is applied to the bed from a point downstream of the condenser.

20. A method according to claim 13 further including a plurality of said beds and simultaneously adsorbing the solvent from at least one of said beds and vacuum distilling the solvent from at least one of said beds.

21. A method according to claim 14 in which the flow of dispersion is continued until the bed contains 25–50 parts by weight of solvent for each 100 parts by weight of adsorbent and then the bed is vacuum distilled to desorb and collect the solvent.

* * * * *